T. F. LORD.
PIPE COUPLING.
APPLICATION FILED MAR. 12, 1913.
1,100,315.
Patented June 16, 1914.
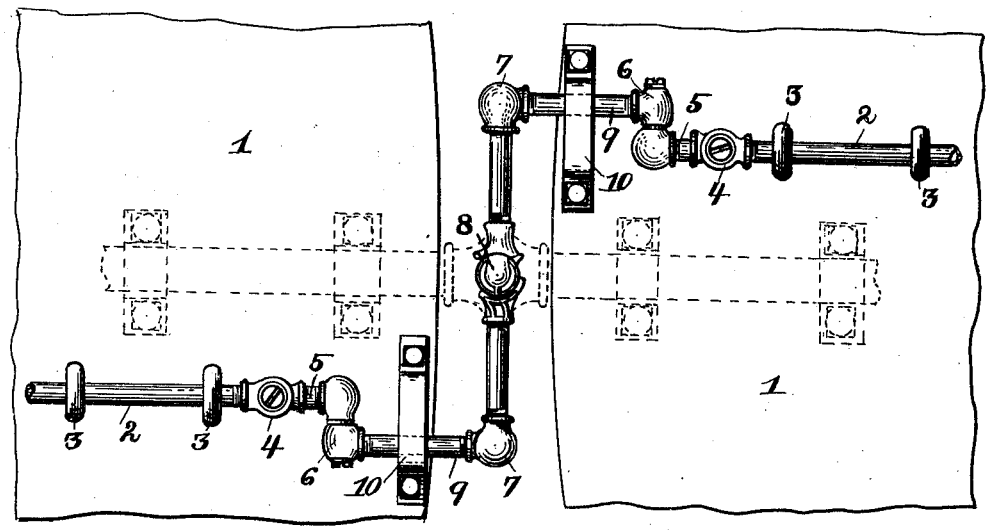
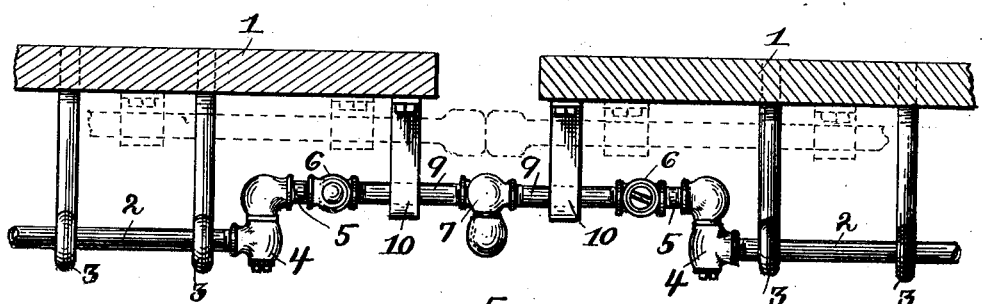
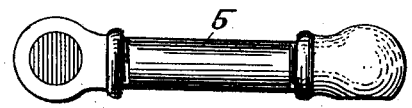
Witnesses:
J. C. Turner
Sylvia Boron
Inventor.
Thomas F. Lord
By Bond + Miller
Attorneys

UNITED STATES PATENT OFFICE.

THOMAS F. LORD, OF MINERAL CITY, OHIO.

PIPE-COUPLING.

1,100,315.  Specification of Letters Patent.  Patented June 16, 1914.

Application filed March 12, 1913. Serial No. 753,685.

*To all whom it may concern:*

Be it known that I, THOMAS F. LORD, a citizen of the United States, residing at Mineral City, in the county of Tuscarawas and State of Ohio, have invented certain new and useful Improvements in Pipe-Couplings, of which the following is a specification.

My present invention relates to pipe couplers used for connecting the pipes to conduct air or steam either for the purpose of actuating the brakes of the cars or for heating the same.

The objects of the present invention are, first, to provide an all metallic pipe as between the cars, and second, to so couple the various members of the pipe in such a manner as to produce a universal joint, third, to do away with the flexible portion of the pipe commonly used and liable to injury by reason of heating or other causes, and fourth, to provide means whereby the joints of the pipes can be so adjusted as to the length of the pipe and the adjustment of the same to bring the joints in proper relative position with reference to each other so that when the cars are coupled together there will be no strain upon any of the joints by the movements of the cars in passing around a curve or any unevenness of the track upon which the cars pass. These objects, together with other objects readily apparent to those skilled in the art, I attain by the construction illustrated in the accompanying drawing, although my invention may be embodied in a variety of other mechanical forms, the construction illustrated being chosen by way of example.

In the accompanying drawing—Figure 1 is a plan view. Fig. 2 is a side elevation showing portions of the cars in section. Figs. 3, 4 and 5 are views illustrating different lengths of pipe sections designed to be located between the horizontal and vertical joints of the pipe proper.

Similar numerals of reference indicate corresponding parts in all the figures of the drawing.

In the accompanying drawing, 1 represents in a conventional way portions of cars showing their draw heads in dotted lines. To the cars are connected the main pipes 2, which are held in proper position with reference to the car in any convenient and well known manner by suitable eye bolts 3, or their equivalents, as the only object desired to be accomplished is to hold the pipes in fixed relative position. The pipes 2 are provided at their confronting ends with the joints 4. From the joints 4 extend the coupling adjusting pipes 5, which pipes are to be formed of such a length that the joints 6 will be brought into proper position with reference to the ends of the cars, so that the proper arrangement as to the various joints will be such that there will be no strain upon any joint of the various joints when the cars are coupled together. This is of importance, owing to the fact that the joints 6 should be a certain fixed distance from the joints 7, so that the arc described in the movements by the joint 7 will be uniform with reference to the joints 6, thereby producing as nearly as possible a uniform movement of the joints 7, regardless of the remaining adjustments, thereby preventing any accidental disconnection of the coupling joint 8.

The coupling joint 8 is shown conventionally for the purpose of allowing the pipe sections 9 to move freely they are suspended in proper relationship by means of the staples or hangers 10. In Figs. 3, 4 and 5 the various adjustments as between the joints 4 and 6 are illustrated, the sections 5 being practically the same in construction except as to length, whereby the proper adjustment is brought about to properly locate the joints 4 and 6 with reference to the coupling of the cars. From the joints 7 extend the pipe sections 11 which are connected together by the coupling joint 8.

Having fully described my invention what I claim as new and desire to secure by Letters Patent, is—

In a pipe coupling, the combination of a pair of fixed main pipes projecting toward each other in parallel relation and provided at their confronting ends with joints; a pair of coupling pipes each provided at opposite ends with a pair of joints the axes of which are at right angles, one joint of each coupling pipe being rotatably connected to the joint on the adjacent main pipe; a pair of pipe sections normally parallel with each other and with said main pipes, each having one end rotatably connected to the other joint on the adjacent coupling pipe; a pair of pipe sections normally alining with each other and at right angles to the first-named pipe sections, and provided at their outer ends with joints to which the other ends of
5 said first-named pipe sections are connected; and a coupling between the inner ends of the second-named sections.

In testimony that I claim the above, I have hereunto subscribed my name in the presence of two witnesses.

THOMAS F. LORD.

Witnesses:
  D. O. VAN KIRK,
  J. E. WAGNER.

Copies of this patent may be obtained for five cents each, by addressing the "Commissioner of Patents, Washington, D. C."